March 29, 1955     J. GREAVES     2,704,970
DISK FOR SEEDERS
Filed Feb. 3, 1953

INVENTOR
Joseph Greaves.
BY George A. Tew
ATTORNEY

United States Patent Office 2,704,970
Patented Mar. 29, 1955

2,704,970

DISK FOR SEEDERS

Joseph Greaves, Toston, Mont.

Application February 3, 1953, Serial No. 334,944

1 Claim. (Cl. 97—217)

This invention relates to an improved furrow opener disk for seeders.

Grain seeders or drills as heretofore provided comprise a dished disk having its axis of rotation disposed in advance of the seed delivery tube and with the disk so disposed that it opens a continuous seed receiving furrow in advance of the deposit of the seed.

Disks of this character are disclosed in the patents to A. L. Johnson 846,469 and P. W. Schwab 1,940,273. In common with the practice heretofore in vogue, the disks of both cited patents have uninterrupted circular peripheries.

It is recognized by those skilled in this particular art that the soil as prepared for seeding is far from being clean but a measurable quantity of mulch and weeds is present in such soil.

While the presence of such mulch or weeds in the soil is not objectionable, so long as the uniform delivery of seed is not disturbed thereby, it has nevertheless been found that the continuous periphery form of disk had a marked tendency to push weeds and mulch which lay in its path ahead of it and into a position to clog the delivery end of the seeder, in spite of the fact that the periphery of the disk is a cutting edge.

It is accordingly one object of the present invention to provide an improved furrow opening disk for seeders by the use of which the above noted objection to the disks heretofore used is substantially wholly overcome.

The furrow opening disks heretofore used on seeders as disclosed for example, in the above cited patents, provided a continuous furrow of substantially uniform depth, which from the seeding standpoint were not objectionable.

It has however, been found that such continuous furrows greatly aided erosion of the soil for the reason that they in fact become rivulets during and after rains, and the longer the furrows the greater the erosive effect of the water therein became.

It is accordingly a further object of the present invention to provide a furrow opening disk for seeders by the use of which the immediately above noted objection to corresponding disks now in use is substantially wholly overcome.

Other objects and advantages of the invention will become apparent in the course of the following detailed description, taken in connection with the accompanying drawing, wherein.

Figure 1:
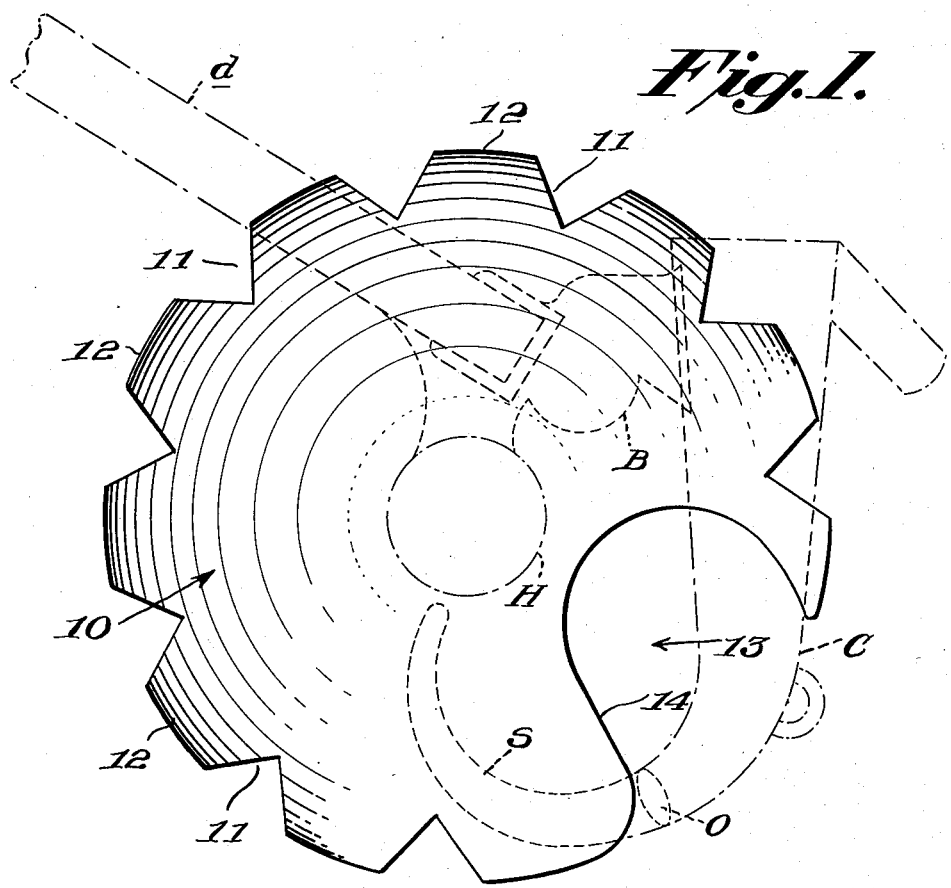
Fig. 1 is a side elevational view of the furrowing and seed delivery portion of a drill or seeder, portions not forming a part of the present invention being shown in dot-and-dash lines.

Referring now in detail to the drawing, 10 designates the improved dished furrow opening disk.

The disk 10 replaces the disks of the cited patents and is removably secured to a hub H which is supported from a bracket B. A draw bar d has its inner end rigidly supported in the bracket B and a seed delivery conduit C is supported adjacent its upper end thereby.

The conduit C as in usual practice terminates in a disk scraping finger S.

The improved disk 10 is provided with a series of circumferentially spaced V-notches 11 with resulting spaced cutting peripheral portions 12.

The referred to alternating notches and cutting portions prevail throughout the major portion of the circumference of the disk.

The disk has a minor circumferential cutout portion which provides a relatively deep recess 13 which opens through the periphery thereof. The recess 13 is of a depth substantially equal to the depth of the furrow F provided by the disk whereby upon each complete rotation of the disk, the furrow F (Fig. 2) is interrupted by small dams D, such dams being at the points of the recess 13 in the disk.

It is to be particularly observed that the edge 14 of the recess is substantially straight while the remainder thereof is substantially uniformly concave radially outwardly in order to avoid mutilation of the dams D upon retraction of the adjacent portion of the disk therefrom.

By the provision of the notches 11 the disk rolls over mulch and weeds which may accumulate within the notches whereby such mulch and weeds are not pushed forward to a position to clog the seed discharge opening O in the delivery conduit C.

Figure 2:
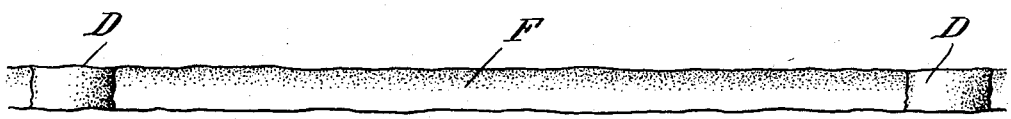
Fig. 2 is a diagrammatic plan view depicting a furrow provided by the improved disk.

While the provision of the notches 11 and cutting portions 12 may form slight transverse ridges in the furrow F, they would be negilgible and have not been indicated in Fig. 2.

By the provision of the dams D in the furrow F, water will accumulate in the spaced sections of the furrow and will have an opportunity to soak into the ground and cannot develop into erosive streams as the case with uninterrupted long furrows provided by disks heretofore in use.

Having set forth my invention in accordance with a single exemplary structural embodiment thereof, what I claim and desire to secure by U. S. Letters Patent is:

A furrow opening disk for use on seeders comprising a dished body member, said body member being provided with a series of uniformly circumferentially spaced V-notches throughout the major portion of the circumference thereof, said notches providing for accumulation of mulch and weeds therein and the peripheral edge of said member intermediate said notches providing peripheral cutting portions, said body member being further provided with a relatively deep furrow damming recess, said recess being of substantially greater radial extent than said notches and opening through the remainder of the circumference of the body member, and said recess being defined by a substantially straight radial wall portion and a wall portion which is concave in a direction toward the periphery of the member.

Reference Cited in the file of the patent

UNITED STATES PATENTS

| Number | Name | Date |
| --- | --- | --- |
| 369,163 | Clark | Aug. 30, 1887 |
| 478,500 | Clark | July 5, 1892 |
| 1,028,402 | Thornton | June 4, 1912 |
| 2,146,222 | Pace | Feb. 7, 1939 |
| 2,211,878 | Benjamin | Aug. 20, 1940 |
| 2,277,622 | White | Mar. 24, 1942 |
| 2,528,897 | Mayfield | Nov. 7, 1950 |